United States Patent [19]

Goto et al.

[11] Patent Number: 5,048,583

[45] Date of Patent: Sep. 17, 1991

[54] HEAVY DUTY PNEUMATIC TIRES

[75] Inventors: Naoyuki Goto; Hiroshi Ueda, both of Kodaira, Japan

[73] Assignee: Bridgestone Corporation, Tokyo, Japan

[21] Appl. No.: 446,884

[22] Filed: Dec. 6, 1989

[30] Foreign Application Priority Data

Dec. 6, 1988 [JP] Japan .................. 63-306962
Oct. 5, 1989 [JP] Japan .................. 1-258905

[51] Int. Cl.$^5$ ............................ B60C 11/12
[52] U.S. Cl. ................... 152/209 R; 152/DIG. 3
[58] Field of Search ........ 152/209 R, 209 D, DIG. 3; D12/152

[56] References Cited

U.S. PATENT DOCUMENTS 3,749,145  7/1973  Hart et al. ................ 152/209 R
4,266,592  5/1981  Takigawa et al. ........... 152/209 D
4,723,584  2/1988  Yamaguchi et al. ......... 152/209 R

FOREIGN PATENT DOCUMENTS 0251204  11/1987  Japan ................ 152/DIG. 3
1-293205  11/1989  Japan ................ 152/209 R Primary Examiner—Michael W. Ball
Assistant Examiner—Mark A. Osele
Attorney, Agent, or Firm—Sughrue, Mion, Zinn, Macpeak & Seas

[57] ABSTRACT

A heavy duty pneumatic tire comprises a tread portion having a pitch pattern and provided with at least two circumferential main grooves extending circumferentially of the tire, wherein at least one dimple is arranged in a region of an island part ranging from a side end of the tread to a position corresponding to not more than 20% of a tread width per one pitch, and a pair of sipes are disposed at opposed positions of each dimple to a widthwise direction of the tire so as to extend in the widthwise direction of the tire. This dimple has a particular ratio of opening size in widthwise direction to opening size in circumferential direction, a size of not more than 8 mm, a particular depth, and a particular total opening area ratio per one pitch.

5 Claims, 3 Drawing Sheets

HEAVY DUTY PNEUMATIC TIRES

BACKGROUND OF THE INVENTION

1. Field of the Invention

This invention relates to heavy duty pneumatic tires used for truck and bus, and more particularly to a heavy duty pneumatic tire capable of effectively preventing the heat accumulation in a shoulder region of a tread portion to sufficiently improve the wear resistance.

2. Related Art Statement

In this type of tire, it has hitherto been attempted to change the compounding of the tread rubber to improve the durability of the tire. According to this technique, the hysteresis loss becomes larger as the wear resistance is improved. Hence the heat build-up becomes large, and particularly separation or other failure is apt to be caused in the shoulder portion due to heat accumulation in the tread shoulder portion having a thicker rubber thickness. Therefore, in order to eliminate such a problem for the improvement of the durability, it is recently and widely practiced that the tread rubber comprises two inner and outer rubber layers b, c having a cap and base structure as shown in FIGS. 3a and 3b. A low heat build-up rubber is used as the base portion b.

In the conventional technique, the cap portion c and the base portion b are separately formed due to the two layer structure of the tread rubber, so that it is necessary to accurately place these portions on a given position and consequently the operability is poor. This is also a fear of air remaining between both the portions. On the other hand, a dual extruder is required for simultaneously conducting the formation of cap portion c and base portion b and always conducting the adequate formation thereof, resulting in considerable increase of equipment cost.

Furthermore, the base portion b composed of low heat build-up rubber has less bond layers between rubber and carbon, so that cracks are apt to be grown and also the cut resistance is poor. Consequently the appearance at last worn stage becomes poor.

SUMMARY OF THE INVENTION

It is, therefore, an object of the invention to provide a heavy duty pneumatic tire having a tread pattern of rib type, block type, lug type or a combination thereof which solves all of problems resulting from the two layer structure of the tread and can prevent heat accumulation in the tread shoulder region to largely improve the wear resistance.

According to the invention, there is the provision of a heavy duty pneumatic tire comprising a tread portion having a pitch pattern and provided with at least two circumferential main grooves extending circumferentially of the tire, characterized in that at least one dimple is arranged in a region of an island part ranging from a side end of the tread to a position corresponding to not more than 20% of a tread width per one pitch, and a pair of sipes are disposed at opposed positions of each dimple to a widthwise direction of the tire so as to extend in the widthwise direction of the tire, and said dimple has a ratio of opening size in widthwise direction of tire to opening size in circumferential direction of tire of 85-115%, a size of not more than 8 mm, a depth corresponding to 40-75% of the circumferential main depth, and a ratio of total opening area to area of island part per one pitch of not more than 15%.

BRIEF DESCRIPTION OF THE DRAWINGS

The invention will be described with reference to the accompanying drawings, wherein.

DESCRIPTION OF THE PREFERRED EMBODIMENTS

Figure 1:
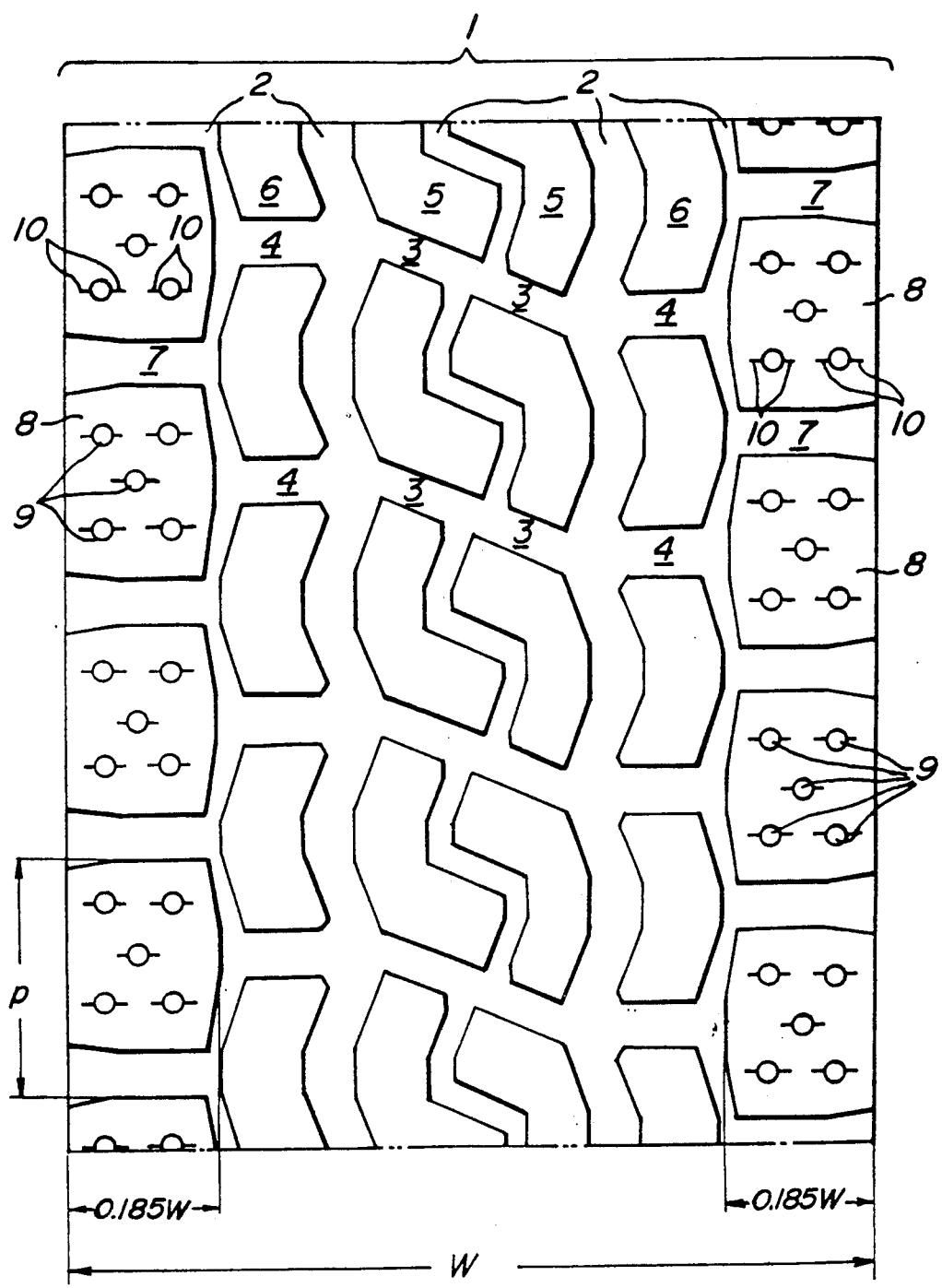
FIG. 1 is a schematic view showing an embodiment of the tread pattern according to the invention.

In the heavy duty pneumatic tires according to the invention, a given number of dimples having a particular size are arranged in the island part at the shoulder of the tread portion to considerably increase the heat dissipation area at the shoulder region. As a result, heat generated during rotation of the tire is effectively dissipated and hence the internal temperature of the shoulder region being apt to be highest due to the heat accumulation can sufficiently be maintained at a low level. As a result, even when wear resistance is expectedly improved, for example, by changing the compounding of the tread rubber into SBR/BR system or NR/SBR system, separation or other failure of the shoulder region due to the heat accumulation can advantageously be prevented.

Moreover, the reason why at least one dimple is arranged in a region of the island part ranging from a side end of the tread to a position corresponding to not more than 20% of a tread width is due to the fact that the shoulder region becomes highest in the temperature during the rotating of the tire and also the outermost circumferential main groove is arranged at a position exceeding 20% of the tread width from the side end of the tread.

In the invention, therefore, there are two cases. In the first dimples are formed in the island portion at each side end of the tread defined by the circumferential main groove over its full width when the width of the island portion is not more than 20% of the tread width. In the second case, the dimples are formed only in a part of the island portion from a line segment passing 20% of the tread width toward the tread end when the width of the island portion exceeds 20% of the tread width.

Further, the reason why at least one dimple is formed per one pitch, i.e. per one pitch of the curved rib when the island portion is a rib or every block or lug when the island portion is comprised of blocks or lugs is due to the fact that the heat dissipation efficiency based on the action of the dimple is uniform in the circumferential direction of the tire as far as possible and the occurrence of wavy wear resulting from the difference in rigidity between blocks is prevented.

Moreover, the reason why two sipes are formed in the dimple is due to the fact that the biting of foreign matter by the dimple is effectively prevented and even if the biting is caused, the leaving off of the foreign matter from the dimple is made easy. When a pair of sipes are formed in the dimple at opposed positions in the widthwise direction of the tire, the dimple is more enlarged as compared with the size of the foreign matter during the rotating of the tire, or the foreign matter bitten into the dimple is easily discharged from the dimple by centrifugal force.

In each dimple, the ratio of opening size in the widthwise direction of the tire to opening size in the circumferential direction of the tire is within a range of 85–115%. If the ratio is outside the above range, the size of the dimple becomes too long in the circumferential or widthwise direction of the tire and there is a high fear of generating cracks from a portion having a small radius of curvature in the elliptical dimple shape. Furthermore, the reason why the size of the dimple or a large opening size in either direction is not more than 8 mm is due to the fact that if the size exceeds 8 mm, the occurrence of the heel and toe wear at the island portion containing the dimple becomes vigorous.

Also, the depth of the dimple is within a range of 40–75% of the depth of the circumferential main groove. When the depth is less than 40%, the heat dissipation effect is deficient and durability to heat build-up is not obtained. When when it exceeds 75%, the rigidity of the island portion is considerably lowered, and consequently an uneven wear or a so-called heel and toe wear is caused and finally grows into wavy wear. In addition, the reason why the total opening area of dimples is limited to not more than 15% to the area of the island portion per one pitch or the surface area of the island portion before the formation of dimples is due to the fact that if it exceeds 15%, the so-called heel and toe wear rapidly increases around the dimple.

An embodiment of the invention will be described with reference to the drawings below.

FIG. 1 shows a tread pattern in an embodiment of the heavy duty pneumatic tire according to the invention. Moreover, the internal structure of the tire is a generic type usually used in this type of the tire, which comprises a radial carcass, a high rigidity belt superimposed about a crown portion of the carcass and a tread portion arranged outside the belt in the radial direction thereof, so that the illustration is omitted.

In FIG. 1, numeral 1 is a tread portion, and numeral 2 a circumferential main groove formed in the central portions of the tread portion 1 and extending in the circumferential direction of the tire. In the illustrated embodiment, there are five circumferential main grooves.

In this embodiment, the circumferential main grooves 2 adjoining to each other in the widthwise direction of the tire communicate with each other by lateral grooves 3, 4 arranged at a given interval in the circumferential direction of the tire, whereby four block rows each comprised of blocks 5 or 6 are formed among these main grooves. Furthermore, an island portion extending from the side end of the tread portion to a position corresponding to 18.5% of tread width W is arranged outward from each of the outermost circumferential main grooves 2 in the widthwise direction of the tire and is divided by a circumferential main groove 2 and lateral grooves 7 arranged at a given interval in the circumferential direction of the tire and extending in the widthwise direction of the tire to form a row of blocks 8.

Of course, such an island portion may be rib or lug type.

Furthermore, at east one dimple 9, is formed per one pitch of the island portion. In FIG. 1 fire dimples are formed per pitch. That is, every each block 8 or lug when the island portion is comprised of blocks or lugs, or per a pitch of a folded rib when the island portion is composed of the rib. A pair of blind sipes 10 extending in the widthwise direction of the tire are formed on each of these dimples 9 at opposed positions in the widthwise direction of the tire wherein the blind sipes do not open to a circumferential groove. For example, the size of the sipe may have a width of 0.6 mm, a length in widthwise direction of tire of 2 mm and a depth of 6 mm.

According to the above structure, the heat dissipation area of each block 8 can uniformly and sufficiently be increased in the circumferential direction of the tire by the dimples 9 and also the rigidity of the block 8 can advantageously be reduced to effectively prevent the occurrence of uneven wear at the shoulder of the tread portion 1. Furthermore, the biting of foreign matters by the dimple 9 can effectively be prevented by arranging a pair of sipes 10 in each of the dimples 9.

In the illustrated embodiment, each of the dimples 9 is a circle having a diameter of 5 mm. Therefore, since the ratio of opening size in widthwise direction to opening size in circumferential direction in each dimple 9 is 100%, the occurrence of cracks from the edge of the dimple 9 is effectively prevented.

Furthermore, the dimple 9 has a depth of 12 mm and a ratio to the depth of the circumferential main groove of 73%. The area of the island portion per pitch or the surface area of each block 8 in the illustrated embodiment is 1280 mm$^2$ and the ratio of total opening area of dimples 9 to the surface area of each block is 8%. Thus, even when using high wear-resistant rubber, the wear resistance of objective level and sufficient durability to heat build-up are obtained, and also the occurrence of heel and toe wear around the dimple is effectively prevented.

Figure 2A:
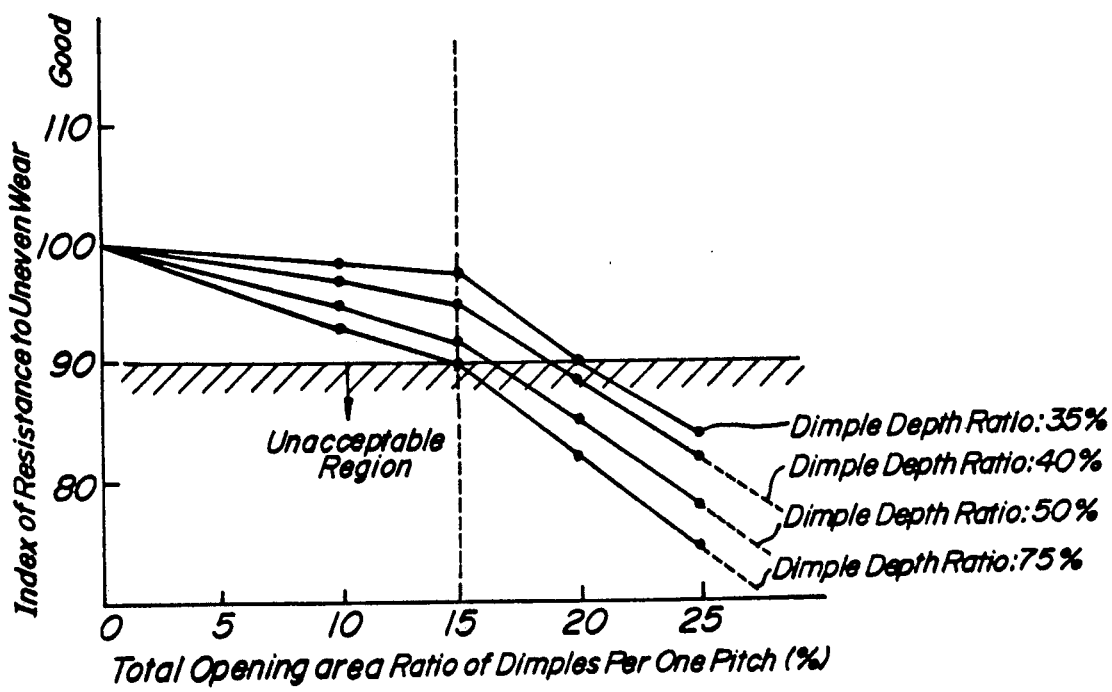
FIGS. 2a and 2b are graphs showing relations of total opening area ratio of dimples per one pitch and depth ratio of dimple to index of uneven wear resistance and durability to heat build-up, respectively.

Moreover, a relationship among total opening area of dimples 9 per one pitch, ratio of dimple depth to depth of circumferential main groove and index of resistance to uneven wear is shown by a graph in FIG. 2a. Here, the index of the resistance to uneven wear is represented on the basis that the conventional tire is 100. The larger the index value, the smaller the occurrence of uneven wear.

As seen from the graph of FIG. 2a, when the dimple depth ratio is 75%, the index of resistance to uneven wear is at a safety wearing state of not less than 90 as the total opening area ratio reaches to 15%. When the total opening area ratio exceeds 15%, the index of resistance to uneven wear becomes an unacceptable wearing state of less than 90 resulting from the decrease of block rigidity. From this fact, it is obvious that the decrease of the index of resistance to uneven wear can be controlled as the dimple depth ratio lowers.

Figure 2B:
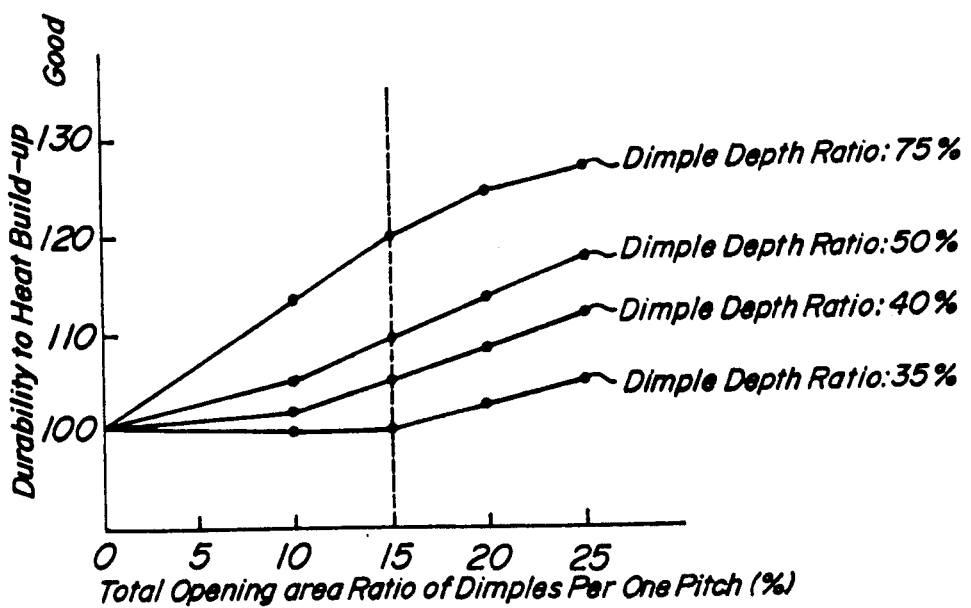
Figure 3A:
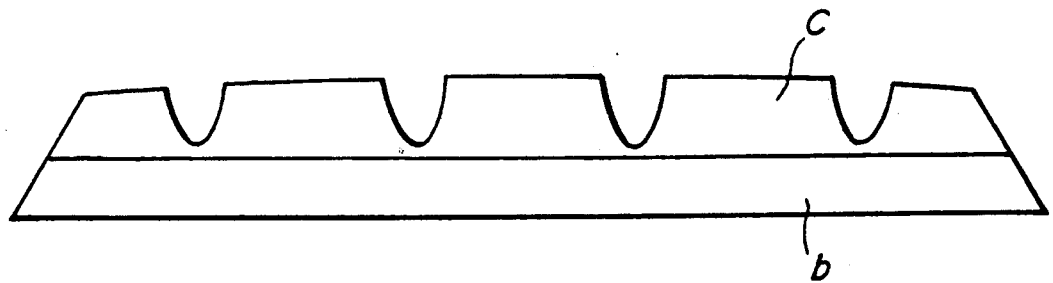
FIGS. 3a and 3b are schematically sectional views of the conventional tread rubber in widthwise direction of tire, respectively.
Figure 3B:
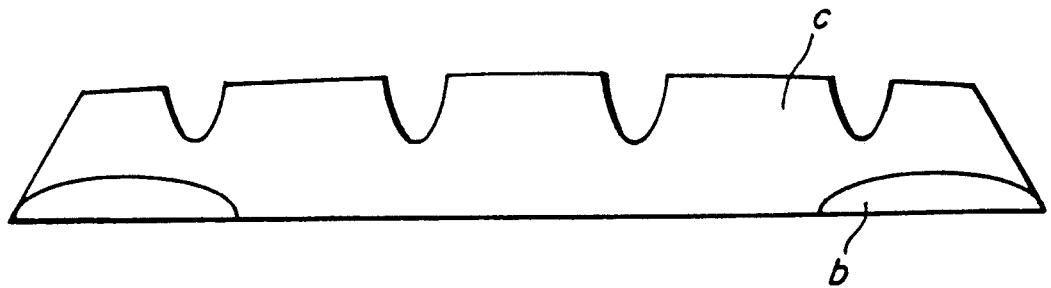

On the other hand, a relationship among total opening area ratio of dimples 9 per one pitch, ratio of dimple depth to depth of circumferential main groove and durability to heat build-up is shown by a graph in FIG. 2b. As seen from FIG. 2b, when the dimple depth ratio is 35%, the durability to heat build-up can not be improved. While when the dimple depth ratio is not less than 40%, the durability to heat build-up can effectively be first improved.

According to the invention, therefore, the dimple depth ratio is limited to a range of 40–75% and the total opening area ratio is limited to not more than 15%.

The following examples are given in illustration of the invention and are not intended as limitations thereof.

The wear resistance of rubber, wear resistance of tire, resistance to uneven wear, durability to heat build-up and wet performance were tested with respect to five heavy duty pneumatic radial tires having a tire size of 1000R 20 and a structure as mentioned later.

Test tires (1) Invention tire I

This tire was a tire having a tread pattern shown in FIG. 1, wherein a dimple diameter was 5 mm, a dimple depth ratio was 50% and a total opening area ratio of dimples was 15%.

(2) Invention tire II

This tire had the same tread pattern as in the invention tire I except that the rubber property of the tread rubber was changed from that of the invention tire I.

(3) Invention tire III

This tire had the same tread pattern as in the invention tire I except that the rubber property of the tread rubber was changed from those of the invention tires I and II.

(4) Conventional tire

This tire was a tire having a tread pattern obtained by removing dimples and sipes from the tread pattern of FIG. 1 and the same rubber property of tread rubber as in the invention tire I.

(5) Comparative tire

This tire had the same tread pattern as in the conventional tire except that the rubber property of tread rubber was same as in the invention tire II.

Test methods (i) Wear resistance of rubber

It was measured by means of a Lambourn abrasion tester and represented by an index.

(ii) Resistance to uneven wear

After the test tire was actually run on good road inclusive of express way at an average speed of 60 km/hr over a distance of 100,000 km, the difference in worn amount in radial direction of tire between kicking-out side and stepping-in side about the dimple was measured and represented by an index.

(iii) Wear resistance of tire

After the test tire was actually run at 60 km/hr over a distance of 100,000 km, the total worn amount was measured and represented by an index.

(iv) Durability to heat build-up

The test tire was run on a drum at a speed of 70 km/hr under a load corresponding to 190% of a normal load of 2425 kg, during which a running distance till the occurrence of separation failure between belt layers was measured and represented by an index.

(v) Wet performance

The braking performance under a normal load and the cornering performance under no load were evaluated by actually running the test tire on a wetted asphalt road surface.

Test results

The test results are represented by an index on the basis that the conventional tire is 100 and shown in the following Table 1.

Moreover, the larger the index value, the better the result.

TABLE 1

| Properties | Tire | | | | |
|---|---|---|---|---|---|
| | Conventional tire | Comparative tire | Invention tire I | Invention tire II | Invention tire III |
| Wear resistance of rubber | 100 | 130 | 100 | 130 | 140 |
| Wear resistance of tire | 100 | 125 | 98 | 123 | 133 |
| Resistance to uneven wear | 100 | 98 | 98 | 96 | 96 |
| Durability to heat build-up | 100 | 90 | 110 | 100 | 90 |
| Wet performances | 100 | 105 | 101 | 105 | 106 |

As seen from the above results, in the invention tire I using the same rubber as in the conventional tire, the wear resistance of tire and the resistance to uneven wear are somewhat decreased owing to the presence of the dimples, but the durability to heat build-up is considerably improved. In the invention tire II using the same rubber having excellent wear resistance as in the comparative tire, the wear resistance of tire can largely be improved as compared with that of the conventional tire. Also, the decrease of the durability to heat build-up inherent to the tread rubber can be covered with the dimples to develop the durability to heat build-up equal to that of the conventional tire.

Accordingly, in the invention tires II and III using high wear-resistant rubber, the wear resistance of tire is considerably improved, while the decrease of the durability to heat build-up can effectively be prevented.

Moreover, in the invention tires II and III, the wet performances can be improved by 5-6% as compared with those of the conventional tire because of the improvement of wear resistance though the somewhat decrease of the resistance to uneven wear is unavoidable.

As mentioned above, according to the invention, the durability to heat build-up can largely be improved based on the increase of heat dissipation area by the arrangement of dimples, so that even when the wear resistance of tire is improved by changing the compounding of tread rubber in accordance with the use purpose, the decrease of the durability to heat build-up can very effectively be prevented. That is, the conflicting properties can be simultaneously established in the invention.

What is claimed is:

1. A heavy duty pneumatic tire comprising; a tread with a pattern having a pitch pattern and provided with at least two circumferential main grooves extending circumferentially of the tire, at least one dimple per one pitch of said tread pattern arranged only in a region of an island portion extending from a side end of the tread to a position corresponding to not more than 20% of a tread width, and a pair of blind sipes disposed at opposed positions of each dimple in a widthwise direction of the tire so as to extend in the widthwise direction of the tire wherein the blind sipes do not open to a circumferential groove, and each said dimple having a cross-sectional size in the range of 5-8 mm and a depth corresponding to 40-75% of a depth of the circumferential main groove, and a ratio of total opening area of dimples to surface area of the region of the island portion ranging from the side end of the tread to a position corresponding to not more than 20% of the tread width in one pitch of the island part is in the range of 0.08:1 to 0.15:1.

2. The heavy duty pneumatic tire according to claim 1, wherein a length of each of said blind sipes is not more than a cross-sectional size of said dimple in the widthwise direction of the tire.

3. The heavy duty pneumatic tire according to claim 1, wherein said tread pattern comprises a block pattern separated by said circumferential main grooves and lateral grooves separating said blocks in a circumferential direction.

4. The heavy duty pneumatic tire according to claim 3, wherein said island portion comprises blocks extending from said tread end inward to a position of substantially 18.5% of said tread width.

5. The heavy duty pneumatic tire of claim 1, wherein said dimples are circular and have a depth that is greater than the diameter.

* * * * *